Patented June 16, 1936

2,044,399

UNITED STATES PATENT OFFICE 2,044,399

SULPHONATION OF WAXES

Alfred Rheiner and Jakob Link, Basel, Switzerland, assignors to firm "Chemical Works formerly Sandoz", Basel, Switzerland No Drawing. Application January 26, 1934, Serial No. 708,512. In Switzerland April 1, 1933

8 Claims. (Cl. 87—12)

The present invention relates to softening-, cleaning, deterging, emulsifying and dispersing agents and to a process for their manufacture.

It has been found that very valuable and active products are obtained if solid or fluid waxes or mixtures thereof are sulphonated in presence of polyhydric alcohols.

In order to carry out the present invention, the solid or fluid waxes of any origin are mixed with polyhydric alcohols and treated with sulphonating agents, or are treated with mixtures of sulphonating agents and of polyhydric alcohols.

As waxes which can be used for the present process products like spermaceti oil, blubber, battlenose oil, wool wax, beeswax and so on can be cited.

As polyhydric alcohol compounds like glycol, polyethyleneglycol, glycerine, sorbit or derivatives of such compounds containing at least two free hydroxy groups such as mono-alkyl, aralkyl or aryl ethers of glycerine, can be used.

As sulphonating agents sulphuric acid of various concentrations and content of sulphur trioxide, or chlorsulphonic acid may be used. The relative proportions of sulphonating agents and of polyhydric alcohols used in the sulphonating operation can be varied within wide limits. It is also possible to prepare first the esters of the sulphonating agents with the polyhydric alcohols, such as glycerine-sulphuric acid, and to carry out the sulphonation of the waxes with the said compounds.

The sulphonating operation can be carried out at temperatures between 0° and 80° C., preferably at temperatures of 35° to 65° C.

Sometimes it is advantageous to carry out the sulphonation in presence of diluting agents such as chloroform, carbon tetrachloride, glacial acetic acid and the like.

According to the quantity of the sulphonating agent used, low or high sulphonated products are obtained.

For example, by treating 100 parts of the wax with 30 to 60 parts of the sulphuric acid ester of a polyhydric alcohol, low sulphonated products are obtained.

On the other hand, by treating, for example 100 parts of the wax with 5–150 parts of the sulphuric acid ester of a polyhydric alcohol, high sulphonated products are obtained.

Therefore, it is possible, by varying the quantity of the sulphonating agent to prepare products of any desirable degree of sulphonation.

The isolation of the products can be carried out in various ways. The high sulphonated compounds are preferably isolated by pouring the reaction mass into water while stirring and by neutralizing the excess of acid, preferably after addition of ice. The sulphonated product can then be isolated from its solution by salting out or by concentrating its solutions preferably in vacuo.

The low sulphonated products are preferably isolated by neutralizing the reaction mixture with an alkali and preferably in presence of ice, in order to avoid local superheating.

According to the process of manufacture used and to the degree of sulphonation obtained, products which are suitable for various applications are obtained. By using a small quantity of sulphonating agent and of polyhydric alcohol, the waxes yield products, which are especially suitable for softening purposes and for emulsifying fats, oils, waxes, paraffin and other water-insoluble products.

By sulphonating the waxes with larger quantities of sulphonating agents and of polyhydric alcohols, products are obtained, which possess besides emulsifying properties, an excellent deterging and cleaning action.

All the products prepared according to the present invention and which are more or less colored powders or pastes possess an excellent stability towards hard water and acids and can, therefore, be used for various purposes in the textile, leather and other allied industries.

One object of the present invention is, therefore, a process for the manufacture of softening, cleaning, deterging, emulsifying and dispersing agents, consisting in sulphonating waxes or mixtures thereof in presence of polyhydric alcohols.

Another object of the present invention is a process for the manufacture of the said valuable products, characterized in that the sulphonation of the waxes is carried out with sulphonating agents, consisting of or containing sulphuric acid esters of polyhydric alcohols.

Still another object of the present invention is the method for sulphonating waxes, consisting in treating the waxes with sulphonating agents in presence of polyhydric alcohols, or with preformed mixtures consisting of sulphonating agents and of polyhydric alcohols at temperatures of 0° to 80° C., if desired in presence of diluting agents.

Still another object of the present invention are the softening-, cleaning-, deterging-, emulsifying- and dispersing agents, which are more or less colored, solid or fluid products, soluble in water and possessing an excellent stability towards hard water and acids and which can be used in the textile, leather and allied industries.

The following examples, without being limitative, illustrate the present process, the parts being by weight.

Example 1

To a mixture consisting of 200 parts of spermaceti oil and 43 parts of anhydrous glycerine there are slowly added at 20–30° C. and while stirring, 100 parts of sulphuric acid monohydrate. Thereupon 100 parts of fuming sulphuric acid (27.5% of $SO_3$) are added thereto at a temperature of 20–25° C., the reaction mixture being slowly heated up to 50–60° C. and stirred for 1½ hours. After cooling, the reaction mass is poured while stirring into water and after addition of ice, neutralized with sodium hydroxide at 20–30° C. The reaction product can thereupon be isolated from the solution by evaporation in vacuo or by salting out.

The product thus obtained is a yellowish paste, possessing an excellent stability towards hard water, acids and alkalis and has excellent deterging properties.

Example 2

Into a mixture consisting of 100 parts of spermaceti and 25 parts of anhydrous glycerine there are introduced while stirring and at 50–58° C. 115 parts of sulphuric acid monohydrate. The reaction mixture is stirred for 2 hours at 55–60° C., cooled down to about 40° C. and worked up in the usual manner.

The product thus obtained is a paste possessing excellent deterging and cleaning properties.

Example 3

To 300 parts of spermaceti oil there are added at 20–45° C. and while stirring, 315 parts of glycerine-sulphuric acid (obtained for example by mixing together 92 parts of sulphuric acid monohydrate, 246 parts of oleum of 67% and 92 parts of anhydrous glycerine at a temperature of 20–25° C.). The reaction mixture is stirred for 1½ hours at 50–55° C., cooled down and worked up as described in Example 1. The product thus obtained is an excellent deterging and cleaning agent.

Example 4

To 300 parts of spermaceti oil there are added at 20–50° C. and while stirring 105 parts of glycerine-sulphuric acid, the reaction mass is stirred for 1–2 hours, cooled down to about 25–30° C., mixed with 60 parts of ice and neutralized with a concentrated sodium carbonate solution.

The product thus obtained is a yellowish paste, possessing excellent softening properties.

By using above 120 parts of glycerine-sulphuric acid a product will be obtained that possesses excellent emulsifying properties and can be used for emulsifying oils, fats, waxes, paraffin and similar water-insoluble compounds.

Example 5

To a mixture of 225 parts of spermaceti oil and of 100 parts of monoxylylglycerine ether there are added at 20–30° C. 125 parts of sulphuric acid monohydrate and thereupon 125 parts of oleum (27% of $SO_3$). The reaction mixture is stirred for 1½ hours at 50–55° C., cooled down to 30° C. and worked up as described in Example 1.

The product thus obtained is a very thick oil, possessing deterging properties.

Example 6

To 300 parts of spermaceti oil there are added at 20–40° C. and while stirring 315 parts of glycol-sulphuric acid, the reaction mixture is stirred at 50–55° C. for 2 hours and worked up as above described.

The product thus obtained possesses excellent cleaning and deterging properties.

What we claim is:—

1. Process of the character described comprising sulphonating waxes of the ester type with sulphonating agents containing sulphuric acid esters of aliphatic polyhydric alcohols at a temperature of 0–80° C.

2. Process of the character described comprising sulphonating spermaceti with a sulphonating agent containing sulphuric acid esters of glycerine at a temperature of 0–80° C.

3. Process of the character described comprising sulphonating spermaceti oil with a sulphonating agent containing sulphuric acid esters of glycerine at a temperature of 0–80° C.

4. Process of the character described comprising sulphonating 100 parts of spermaceti with 30–60 parts of a sulphonating agent containing sulphuric acid esters of glycerine at a temperature of 0–80° C.

5. Process of the character described comprising sulphonating 100 parts of spermaceti with 60–150 parts of a sulphonating agent containing sulphuric acid esters of glycerine at a temperature of 0–80° C.

6. The herein described sulphonated waxes of the ester type, obtainable by sulphonation of waxes of the ester type with sulphonating agents containing sulphuric acid esters of aliphatic polyhydric alcohols at a temperature below 80° C., which are soluble in water, possess an excellent stability towards hard water and acids, and are usable as softening, cleaning, deterging, emulsifying and dispersing agents.

7. The herein described sulphonated wax of the ester type, obtainable by sulphonating spermaceti with glycerine trisulphuric acid ester at a temperature below 80° C., which is soluble in water, possesses an excellent stability towards hard water and acids, and is usable as a cleaning, softening, emulsifying and dispersing agent.

8. The herein described sulphonated wax of the ester type, obtainable by sulphonation of spermaceti oil with glycerine trisulphuric acid ester at a temperature below 80° C., which is soluble in water, possesses an excellent stability towards hard water and acids, and is usable as cleaning, softening, deterging, emulsifying and dispersing agent.

ALFRED RHEINER.
JAKOB LINK.